United States Patent [19]

Dieterle et al.

[11] Patent Number: 4,835,610
[45] Date of Patent: May 30, 1989

[54] ARRANGEMENT FOR AUTOMATIC SWITCHING OF THE REGULATING SPEED OF A PHASE REGULATING CIRCUIT

[75] Inventors: Franz Dieterle, Georgen; Uwe Hartmann, Villingen-Schwennimgen; Udo Mai, Villingen, all of Fed. Rep. of Germany

[73] Assignee: Deutsche Thomson-Brandt GmbH, Villingen, Fed. Rep. of Germany

[21] Appl. No.: 192,863

[22] Filed: May 11, 1988

[30] Foreign Application Priority Data

May 13, 1987 [DE] Fed. Rep. of Germany ....... 3715929

[51] Int. Cl.[4] .......................... H03L 7/00; H04N 5/04
[52] U.S. Cl. ...................................... 358/158; 358/159
[58] Field of Search ................ 358/158, 159, 148, 149

[56] References Cited

U.S. PATENT DOCUMENTS 4,461,999 7/1984 Wolf et al. ......................... 358/159
4,553,163 11/1985 Sauer .................................. 358/159

Primary Examiner—Theodore M. Blum
Attorney, Agent, or Firm—Max Fogiel

[57] ABSTRACT

An arrangement for automatic switching of the regulating speed of a phase regulating circuit, in which the regulating speed is not switched abruptly. The regulating speed is, instead, switched either discontinuously or continuously, so that it does not attain a high level before the midpoint of the synchronizing pulse. The regulating speed is increased within a synchronizing window to an increasing extent up to the midpoint of the window, whereas the regulating speed decreases to a decreasing extent from that midpoint. The regulating speed of the phase regulating circuit is associated with the horizontal deflection in a television receiver, where interference in the vicinity of the synchronizing pulse has a detrimental effect, particularly near the edges.

6 Claims, 2 Drawing Sheets

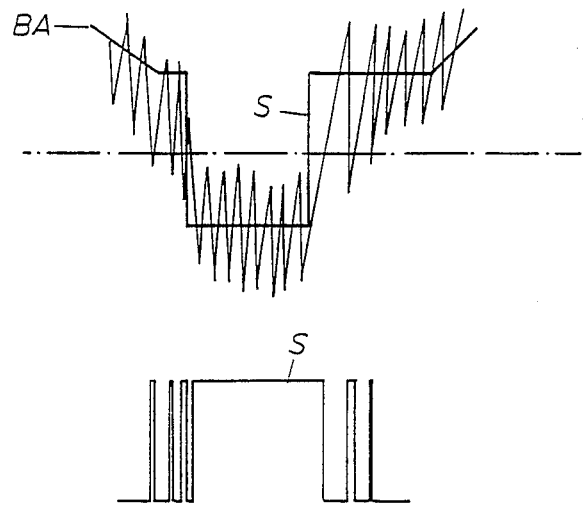
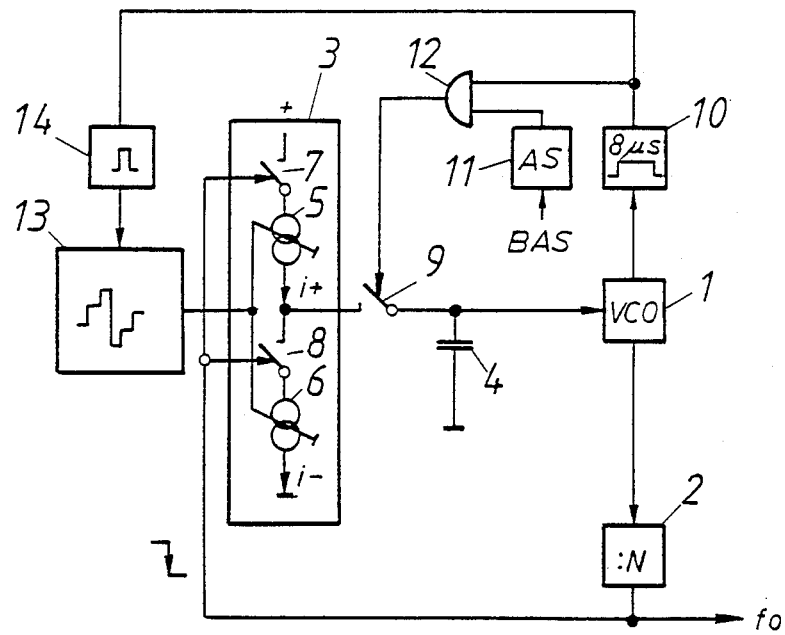
Fig.1
Fig.2

ARRANGEMENT FOR AUTOMATIC SWITCHING OF THE REGULATING SPEED OF A PHASE REGULATING CIRCUIT

The invention relates to an arrangement for automatic switching of the regulating speed of a phase regulating circuit for an oscillator to generate synchronizing signals for the horizontal deflection of beams of electrons in the picture tube of a television receiver.

That the regulating speed of the phase regulating circuit for a line oscillator increased, or in a television receiver must be meaning that the phase regulating circuit must be increased, meaning that the phase regulating circuit must have a smaller time constant, when the receiver is connected to a videorecorder and the video signals emitted from the recorder are to be displayed on the screen is known. To improve the elimination of interference, the time constant of the phase regulating circuit must be increased again when a broadcast signal is to be received, meaning that the regulating speed must be decreased. The regulating speed can be varied either by switching the capacitance of the capacitor in the filter circuit of the phase regulating circuit or by switching the amplitude of the current that controls the sources of constant current that charge and discharge the capacitor. The extent of variation is a parameter that is prescribed in accordance with the particular mode of operation: videorecorder or television receiver. When the regulation is carried out in accordance with the aforesaid sources of constant current, they are engaged and disengaged by the synchronizing pulse and their polarity controlled by one edge of the signal generated by the oscillator. In the transient state, the polarity of the sources of constant current is switched when for example the edge of the oscillator signal is at the midpoint of the synchronizing pulse. The control current is engaged by the synchronizing signal from the amplitude separator in the television receiver. The synchronizing signal itself is released only in the presence of a window created by the oscillator. This window has a width of 8 $\mu$sec for example. The synchronizing pulse itself is 4.5 $\mu$sec wide. The on the whole constant control current produces a specific charge Q in the filter capacitor and within the window that is independent of the phase of the resulting oscillator signal and depends only on the time it takes the sources of constant current to engage. Interfering pulses that occur within the window can affect the charge and hence the phase. The interference pulses outside of and at the edges of the synchronizing pulse will accordingly appear more intensely than those inside the synchronizing pulse.

The object of the invention is accordingly to make phase regulation and its speed independent of interference, allowing a much smaller time constant. This object is attained by the invention recited in the major claim.

The essentials of the invention will now be described with reference to one embodiment by way of example.

FIG. 1 illustrates a synchronizing pulse subject to interference,

FIG. 2 is a circuit diagram illustrating the principle behind the invention, and FIG. 3a–3h consists of relevant graphs.

Figure 3:
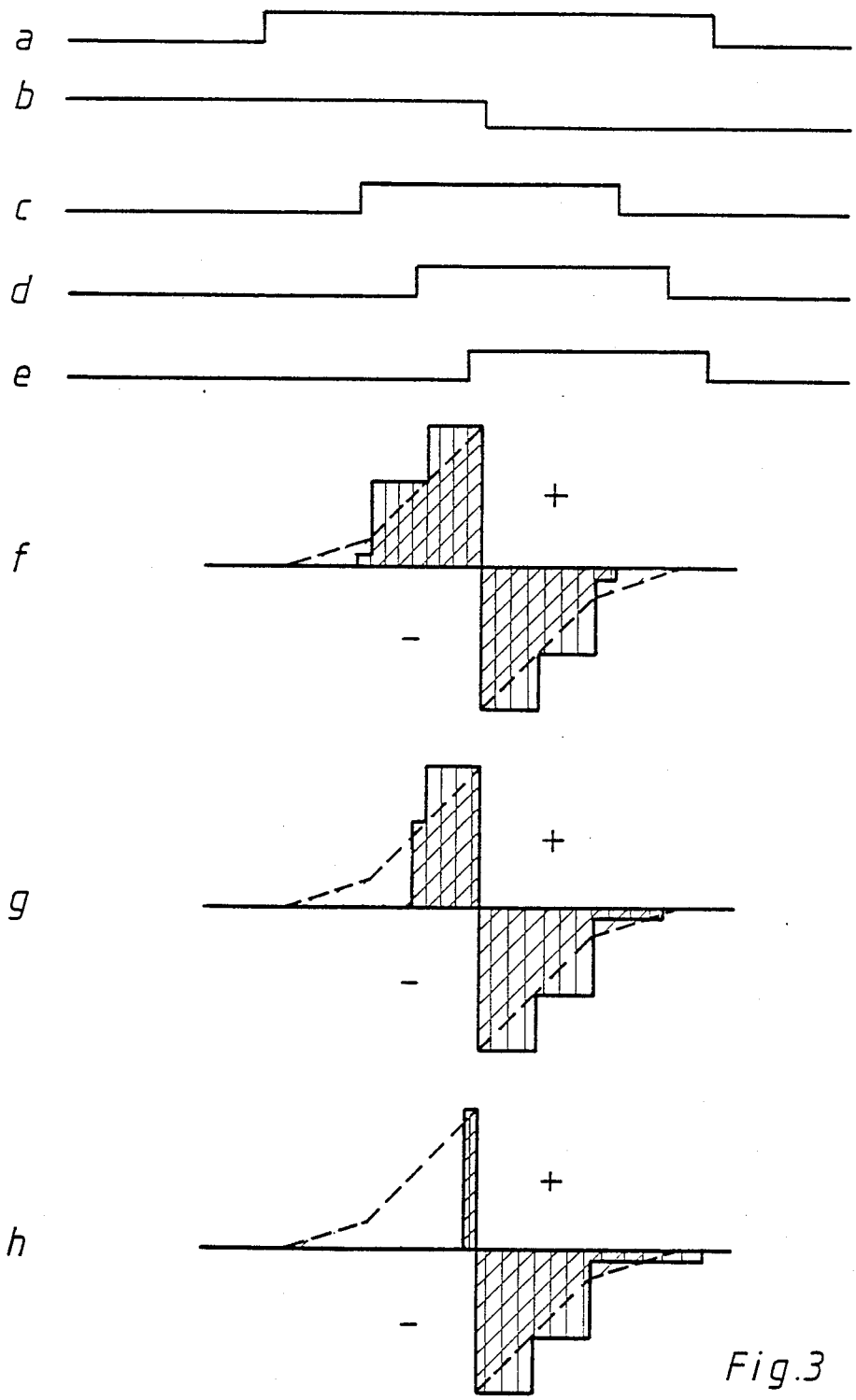

FIG. 1a illustrates a BAS signal subject to interference, the effect of which is to be decreased by means of the invention described in what follows. A synchronizing pulse S, which is separated over its cutoff level from the BA signal in an amplitude separator, occurs within a synchronizing window F. FIG. 1b illustrates the separated synchronizing pulse. It will be evident that interference occurs only at the edges and does not appear at the midpoint of the pulse. The interference pulses are not uniformly distributed inside the synchronizing window. The point of departure for the invention is the awareness that the regulating speed must be low in the vicinity of the edges of the synchronizing pulse and can without any problem be high at the midpoint for the purpose of eliminating the effects of interference.

FIG. 2 illustrates a voltage-controlled oscillator (VCO) 1 that is synchronized by means of a phase-regulated loop (PLL) to the frequency of the transmitter signal (BAS). The frequency of oscillator 1 is separated down to the synchronizing frequency by a separator 2 and compared with the BAS signal in a phase-comparison stage 3. Deviations in phase and frequency supply a control signal to a filter capacitor 4 that shifts the frequency and phase into the nominal position. Phase-comparison stage 3 operates with two sources 5 and 6 of constant current. Source 5 charges filter capacitor 4 and source 6 discharges it. Whether it is to be charged or discharged is determined by the negative edge of the oscillator-generated signal, the level of which dictates whether the charging contact 7 or the discharging contact 8 is closed. Charging and discharging occurs by way of a switch 9 that closes when a temporal window 10 generated by oscillator 1 and e.g. 8 $\mu$sec wide chronologically coincides with the synchronizing pulse from an amplitude separator 11 as symbolically represented by an AND gate 12. The circuitry also contains a component 13 that does not now switch the amplitude of the control current from a specific low level to a prescribed higher level but switches the amplitude to high from the edge of the window to its midpoint and then down again, whereby the switching of the amplitude and hence the regulating speed is increased to an increasing extent or decreased to a decreasing extent. There are for this purpose different ways in which the regulating speed can be varied over time. It can for example occur in that another temporal window 14 that is 2 $\mu$sec long and positioned symmetrically at the midpoint of temporal window 10 increases the control current by a prescribed increment.

The curve a in FIG. 3 represents the synchronizing window. The edge of oscillator signal b is precisely at the midpoint of synchronizing pulse c when the phase relation is correct. Curves d and e represent synchronizing pulses that have been displaced 1 and 2 $\mu$sec respectively as the result of jitter. Graph f represents the charging current i+ and the discharging current i− resulting from the correct phase relation for the synchronizing pulse as illustrated in FIG. 3c. The currents i+ and i− from the two sources 5 and 6 are not immediately switched to a constant higher level by switches at the high regulating speed, but either step by step or, as represented by the broken curve, continuously as far as the midpoint of the window. This measure weakens the effect of interference pulses outside the synchronizing pulses on the regulating process. Graph g in FIG. 3 is associated with the phase shift of the synchronizing pulse represented in FIG. 3d and graph h with that represented in FIG. 3e.

The increase in currents i+ and i− as far as the midpoint of the window increases the sensitivity of the regulating speed in that range. The synchronizing pulse in the same range is a useful signal with a negligible percentage of interference in the vicinity of its edges. Acting on the regulating speed by increasing it as far as the midpoint of the window allows rapid regulation in the presence of temporal displacement (jitter) of the synchronizing signal during videorecorder operation with no perceptible loss in the elimination of interference.

We claim:

1. An arrangement for automatic switching of the regulating speed of a phase regulating circuit, comprising: an oscillator to generate synchronizing signals for the horizontal deflection of beams of electrons in a television receiver picture tube; and means for increasing the regulating speed of the phase regulating circuit within a synchronizing time window to an increasing extend up to a midpoint of the window for reducing noise effects at edges of the window; said means decreasing the regulating speed to a decreasing extend after midpoint, noise effects being substantially absent at said midpoint where the regulating speed is relatively high, the regulating speed being relatively low adjacent the ends of the synchronizing signal.

2. An arrangement as defined in claim 1, wherein said means increases and decreases the regulating speed discontinuously.

3. An arrangement as defined in claim 1, wherein said means increases and decreases the regulating speed continuously.

4. An arrangement as defined in claim 1, wherein said means increases and decreases said regulating speed inside said synchronizing time window continuously and at different slopes.

5. An arrangement as defined in claim 4, wherein the slope of variation in regulating speed is always less steep at the edge of said synchronizing time window than at said midpoint.

6. An arrangement for automatic switching of the regulating speed of a phase regulating circuit comprising: a voltage-controlled oscillator; a phase-regulated loop for synchronizing said oscillator to the frequency of a television transmitter signal; divider means for dividing down the frequency of said oscillator; phase-comparison means for comparing an output of said divider means with said transmitter signal; filter means receiving deviations in phase and frequency of a control signal supplied by said phase-comparison means, said filter means shifting frequency and phase into a nominal state; two sources of constant current for operating said phase-comparison means; one of said current sources charging said filter means and the other one of said current sources discharging said filter means dependent by the negative edge of the oscillator output signal having a level determining whether said filter means is to be charged or discharged; switching means for charging and discharging said filter means when a temporal window generated by said oscillator coincides chronologically with a sychronizing pulse from an amplitude separator; means for switching the amplitude to a relatively high level from the edge of said window to the midpoint of said window and then switching the amplitude level down again, switching of the amplitude and thereby the regulating speed being increased to an increasing extent or decreased to a decreasing extent.

* * * * *